United States Patent [19]
Koga

[11] Patent Number: 6,073,893
[45] Date of Patent: Jun. 13, 2000

[54] POWER SEAT DEVICE

[75] Inventor: Yoshitaka Koga, Kariya, Japan

[73] Assignee: Aisin Seiki Kabushiki Kaisha, Kariya, Japan

[21] Appl. No.: 09/135,541

[22] Filed: Aug. 18, 1998

[30] Foreign Application Priority Data

Aug. 18, 1997 [JP] Japan .................................. 9-237751

[51] Int. Cl.[7] ........................... F16M 11/00; F16M 13/00
[52] U.S. Cl. ........................ 248/157; 248/424; 248/421; 248/422
[58] Field of Search ...................... 248/424, 421, 248/422, 157; 297/344.17, 344.12, 344.2, 330

[56] References Cited

U.S. PATENT DOCUMENTS 5,938,164 8/1999 Kargol et al. ........................ 248/424
5,964,441 10/1999 Gauger et al. ........................ 248/421
5,967,471 10/1999 Borlinghaus et al. ................... 248/157

FOREIGN PATENT DOCUMENTS 7-117534 5/1995 Japan .

*Primary Examiner*—Ramon O. Ramirez
*Assistant Examiner*—Jerome A. DeLuca
*Attorney, Agent, or Firm*—Burns, Doane, Swecker & Mathis, LLP

[57] ABSTRACT

A power seat device includes a lifting mechanism having a rocking member for moving a seat cushion up and down, an axially movable screw member retained at its one end by the rocking member, and a housing box provided with a gear mechanism for reducing the revolution of a motor to move the screw member axially. The power seat device is also provided with a holding member for retaining and holding the housing box.

16 Claims, 5 Drawing Sheets

POWER SEAT DEVICE

This application is based on and claims priority under 35 U.S.C. § 119 with respect to Japanese Application No. 09(1997)-237751 filed on Aug. 18 1998, the entire content of which is incorporated herein by reference.

FIELD OF THE INVENTION

The present invention generally relates to vehicle seats. More particularly, the present invention pertains to a power seat device for vehicles.

BACKGROUND OF THE INVENTION

In known types of power seat devices, the portion of the device to which is attached the seat belt is retained on the vehicle floor or a seat rail so that the load acting on the seat belt at the time of a collision is released to the vehicle floor either directly or through the seat rail. As a result, the load of the seat belt is not applied to the link portion of the vertical lifter or to the link portion of the seat belt.

Unexamined Published Japanese Patent Application No. 7-117534 discloses a power seat device in which, as illustrated in FIG. 5, a seat belt B is retained and fixed on the side of the seat cushion C. The load acting on the seat belt B at the time of a collision is transferred from a carrier K to a housing box H by way of a link plate L1 connected to the carrier K, a rod R connected to the link plate L1, a link plate L connected to the rod R, a screw S connected to the link plate L, and eventually to the housing box H.

In this known type of power seat device, because the housing box H possesses insufficient holding strength and because the housing box possesses insufficient strength itself when the housing box is made of a synthetic resin material, the housing box H becomes loose or breaks when the load acting on the seat belt B is transferred. This of course adversely affects the overall safety of the seat.

SUMMARY OF THE INVENTION

In light of the foregoing, the present invention provides a seat slide device that includes a lifting mechanism having a rocking member for moving a seat cushion up and down, an axially movable screw member retained at its one end by the rocking member, and a housing box provided with a gear mechanism for reducing the revolution of a motor to move the screw member axially. The power seat device is also provided with a holding member for retaining and holding the housing box. This construction is advantageous as it prevents the housing box from coming loose and breaking, and prevents impact loads from being transferred in a way that would compromise the safety of the seat.

According to the present invention, the holding member is arranged on the load input side (and also the load output side) of the housing box. A fixing portion is arranged on the load output side of the housing box for fixing the holding member in place. The fixing portion is preferably arranged along the axis of the screw member and the holding member can be provided with an extension that extends towards and is connected to the fixing portion, with the extension being arranged on the load output side of the housing box. Also, the housing box is retained on the motor by a retaining member.

According to another aspect of the invention, a power seat device includes a lift mechanism having a swinging member for vertically moving a seat cushion, an axially movable screw member connected to the swinging member, a housing box adapted to be connected to a motor, with screw member being operatively connected to the housing box and the housing box including a reduction mechanism for reducing the rotational speed of the motor. The housing box is connected to a holding member. A fixing member is adapted to be connected to a rail, and the holding member is connected to the fixing member.

Another aspect of the present invention involves a power seat device that includes a lift mechanism for vertically moving a seat cushion, an axially movable screw member operatively connected to the lift mechanism, a motor, and a housing box connected to the motor. The housing box includes a reduction mechanism for reducing the rotational speed of the motor, with the screw member being operatively associated with the housing box for being axially moved under operation of the motor. The power seat device further includes a fixing bracket, and a mechanism for transferring an impact load applied to the housing box to the fixing bracket to prevent damage to the housing box.

BRIEF DESCRIPTION OF THE DRAWING FIGURES

The foregoing an additional details associated with the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
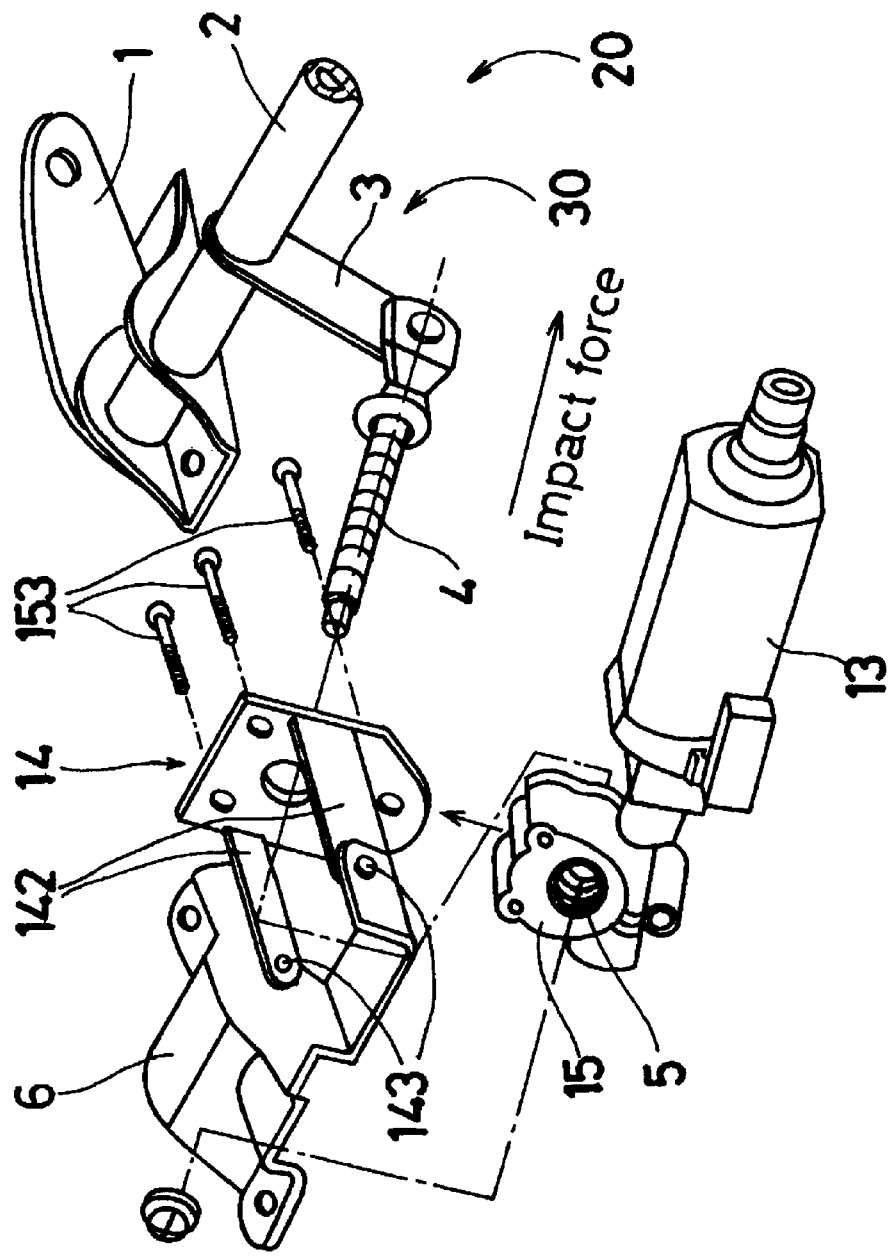
FIG. 1 is an exploded perspective view of a portion of a vehicle power seat device according to the present invention showing the housing box.

With reference initially to FIG. 1, the power seat device in accordance with the present invention generally includes a lifting mechanism 20 for lifting a vehicle seat. This lifting mechanism 20 includes a rocking member 30 for moving the seat cushion 21 up and down. A screw member 4 is retained at its one end by the rocking member 30 and is adapted to be axially moved. A housing box 15 is outfitted with a reduction gear mechanism 5 for reducing the revolution of a motor 13 to axially move the screw member 4.

The power seat device further includes a holding member 14 which is retained by a fixing member 6. The holding member 14 holds the housing box 15 so that the housing box 15 is retained in place.

Figure 2:
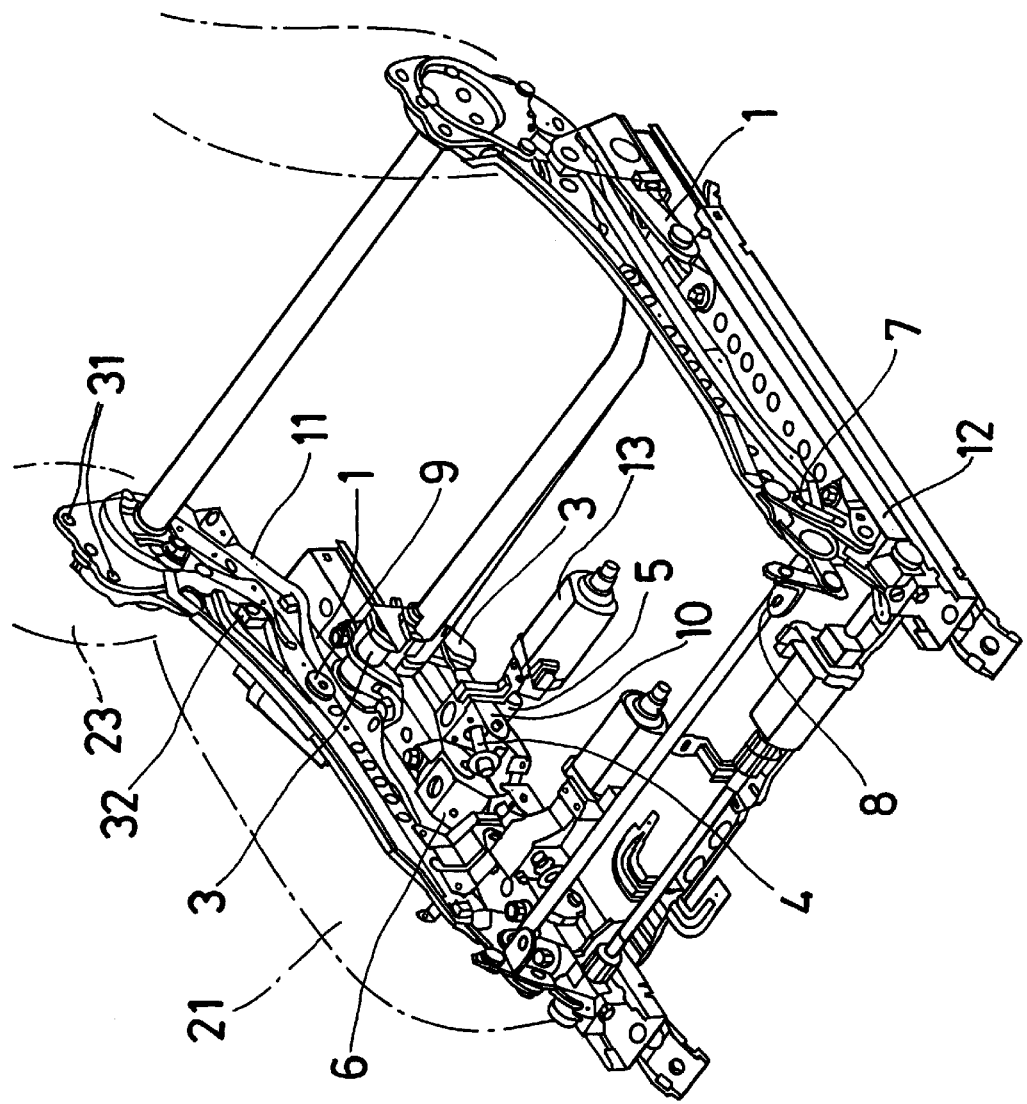
FIG. 2 is a perspective view of the entire power seat device according to the present invention.

As shown in FIG. 2, the seat cushion 21 on which a driver or passenger sits is supported at its front portion by a carrier 11 through a front lifting mechanism 8. The seat cushion 21 is supported at its rear portion in a rocking manner by a supporting portion 9 of the carrier 11. As also shown in FIG. 2, the carrier 11 supports a seat back 23 that is adapted to support the back of the driver or passenger. The seat back 23 is supported through a reclining mechanism and is provided with a holding portion 32 for holding a seat belt.

The front portion of the carrier 11 is fixed to a link plate 7 which is pivotally retained on an upper rail 12 for moving the seat cushion 21 back and forth. The rear portion of the carrier 11 is retained by a first link plate 1 which is joined to a rod 2 (shown in FIG. 1) that is rotatably mounted on the upper rail 12, so that the retained portion can turn integrally with the rod 2.

A second link plate 3 is joined to one end of the rod 2. The second link plate 3 is adapted to move back and forth to move the first link plate 1 up and down.

The screw member 4 is rotatably connected at one of its ends to one end of the second link plate 3. The screw member 4 also meshes with the threaded portion of the housing box 15 which is equipped with the reduction gear mechanism 5 having a gear box 10. As the threaded portion of the housing box 15 is rotated by the revolution of the motor 13 to move the screw member 4 back and forth, the screw member 4 moves the seat carrier 11 up and down so that the seat cushion 21 is moved up and down.

Figure 3:
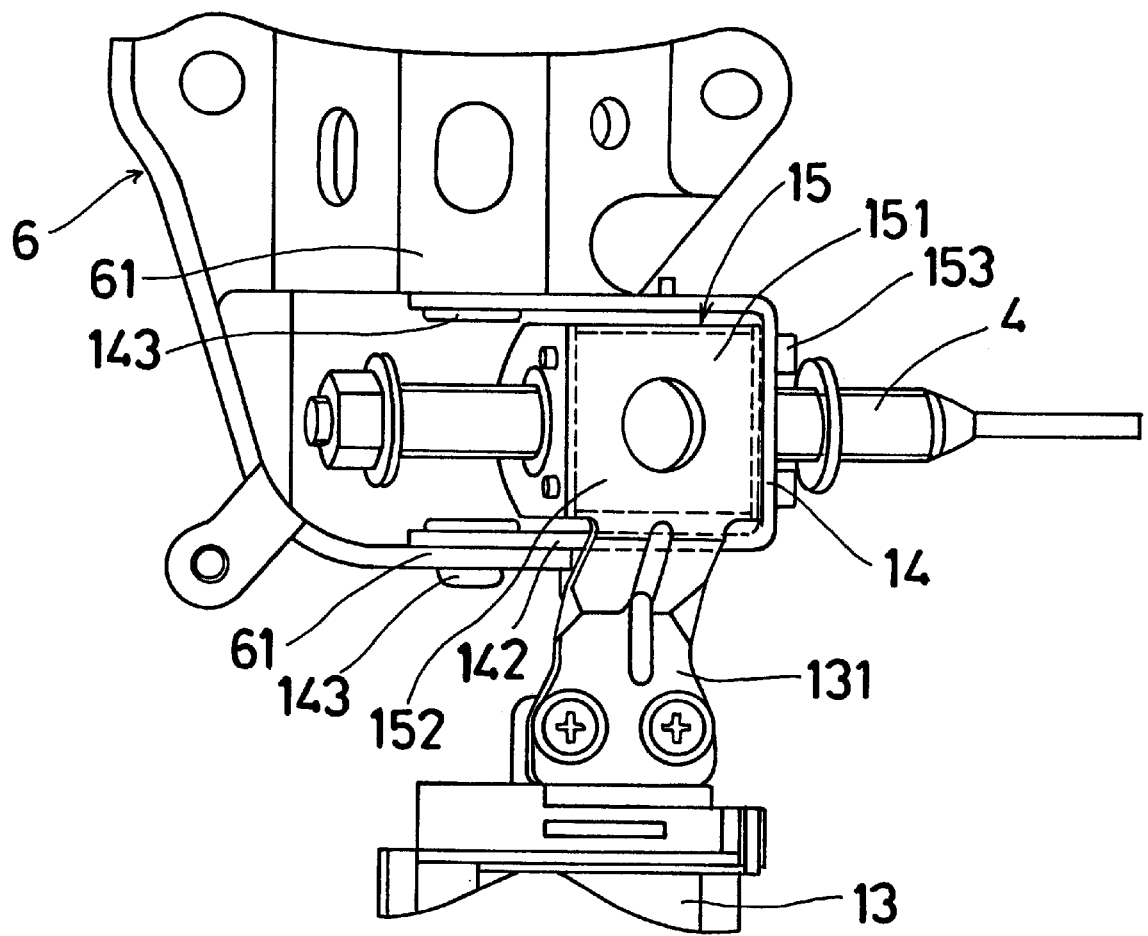
FIG. 3 is a top plan view of a portion of the power seat device shown in FIG. 1.
Figure 4:
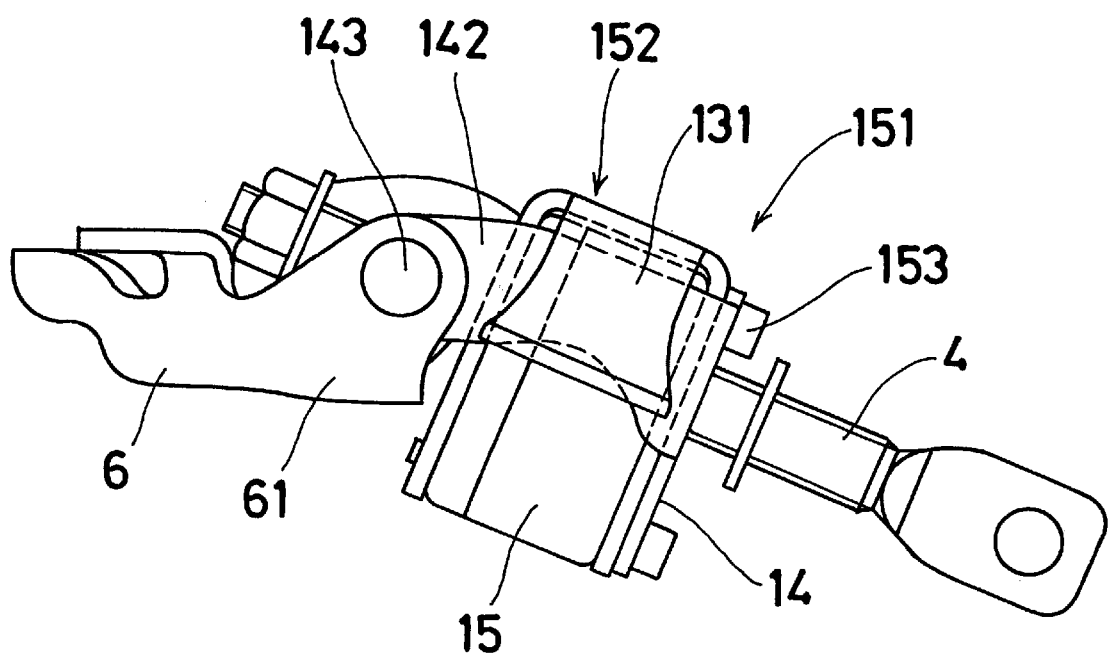
FIG. 4 is a side elevation of a portion of the power seat device illustrated in FIG. 1.
Figure 5:
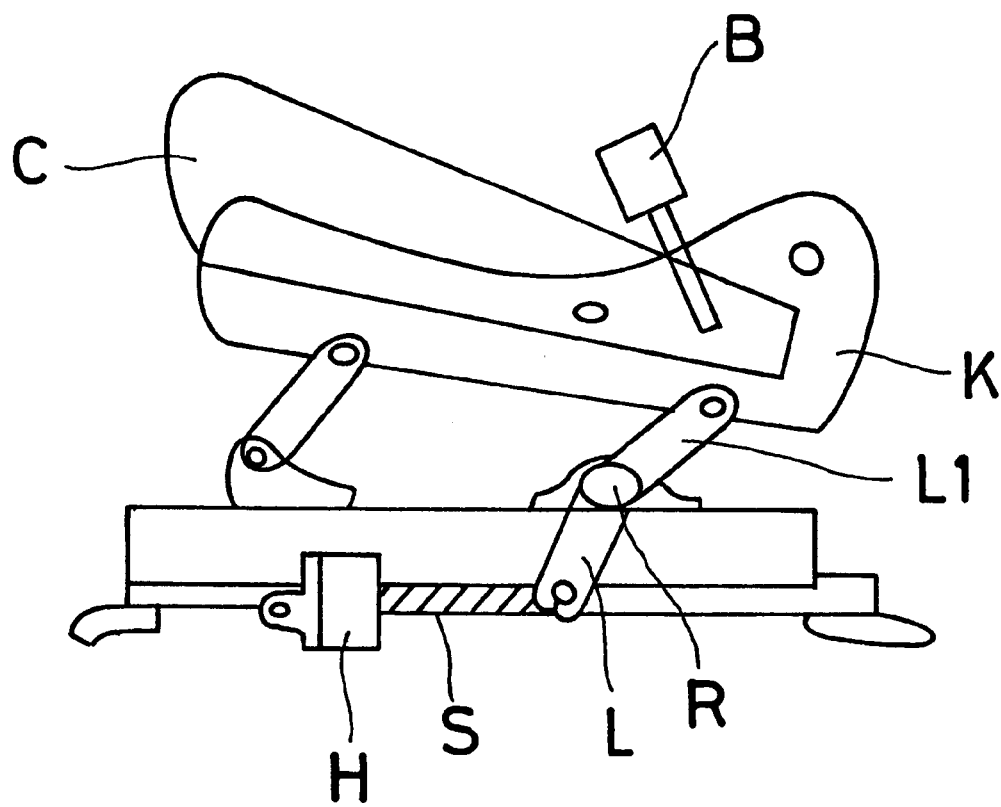
FIG. 5 is a side view of a power seat device having a known construction.

As best seen with reference to FIG. 3, the housing box 15 is retained and mounted on the motor 13 by way of a mounting bracket 131, which acts as a retaining member, and a plurality of screws. The mounting bracket 131 is formed as an inverted U-shaped member formed of a pair of spaced apart side walls and a connecting upper wall. The two side walls can be mounted on the motor 13 with the housing box 15 being accommodated between the upper wall and the side walls forming the inverted U-shaped bracket member 131.

The housing box holding bracket 14 acting as the holding member includes a plate member arranged on the load input side 151 (i.e., is located on the righthand side as seen with reference to the drawing figures) of the housing box 15. As seen in FIG. 3, the plate member is provided with a plurality of holes for receiving screws 153. The housing box 15 is fixed together with the paired vertical walls of the mounting bracket 131 on the housing box holding bracket 14 by way of the screws 153.

The housing box holding bracket 14 is retained in a rocking or pivoting manner on the fixing bracket 6 by way of several pins 143. The fixing bracket 6 is fixed on the upper rail 12 that acts as the stationary portion. The pins 143 are oriented perpendicular to the axis of the screw member 4.

The fixing bracket 6 functions as a fixing element for fixing the housing box holding bracket 14 which in turn fixes the housing box 15. The fixing bracket 6 is arranged on the load output side 152 of the housing bracket 15. The fixing bracket 6 includes fixing or retaining portions 61 that are arranged in a plane that is generally parallel to the plane of movement of the screw member 4.

The housing box holding bracket 14 extends towards the fixing or retaining portion 61. The housing box holding bracket 14 includes two spaced apart arms 142 acting as extensions of the plate member to which the housing box 15 is connected. The arms 142 extend on opposite sides of the housing box 15 and are retained on the fixing portions 61 of the fixing bracket 6 by the pins 143. Thus, the arms 142 extend from the load input side 151 of the housing box 15 towards the load output side of the housing box 15.

In the power seat device thus constructed according to the present invention, the revolution of the motor 13 is decelerated by the reduction gear mechanism 5 which is mounted in the housing box 15. This causes the screw member 4, which is reduced in speed and meshes with the threaded portion of the gear mechanism, to move axially.

As the screw member 4 moves in the axial direction, the second link plate 3 turns because the second link plate 3 is pivotally retained at one end of the screw member 4. The second link plate 3 is turned together with and on the axis of the rod 2 which is rotatably retained on the upper rail 12. At this time, the housing box holding bracket 14 rocks or pivots on the pins 143 with respect to the fixing bracket 6 to accommodate variations in the orientation of the screw member 4 and absorb differences in the turning loci. In this way, as the screw member 4 moves axially and changes inclination, the housing box holding bracket 14 moves also to avoid application of excessive forces to the screw member 4 and the housing box 15. Through rotation of the rod 2, the first link plate 1, which is joined to the rod 2, is turned up and down to move the seat up and down.

Because the seat belt fixing portion 32 is arranged at the carrier 11, the load applied to the seat belt when an impact load occurs such as during a collision is inputted to the fixing bracket 6 acting as the fixing portion. The impact load is transferred to the fixing bracket 6 through the carrier 11, the first link plate 1, the rod 2, the second link plate 3, the screw member 4 and to the housing box 15. By virtue of the mounting of the housing box 15 on the housing box holding bracket 14, the impact load applied to the screw member 4 is transferred to the housing box holding bracket 14 which holds the housing box 15. The impact load is thus transferred from the load input side 151 of the housing box 15 to the load outside side of the housing box 15 by passing along the arms 42 of the housing box holding bracket 14, with such impact load then being transferred to the fixing portions 61 of the fixing bracket 6 and to the upper rail 12. As a result, the load applied to the seat belt at the time when an impact load arises, such as during a collision, is prevented from being inputted or transmitted only to the housing box 15. Instead, the load is transferred to the housing box holding bracket 14 and the fixing bracket 6.

The power seat slide device of the present invention is thus advantageously constructed so that the screw member 4 retained at its one end by the second link plate 3 which acts as the rocking member for the lifting mechanism for moving the seat cushion up and down is permitted to move axially and is able to change inclination by the housing box holding bracket 14 acting as the holding member for the housing box 15. In addition, the housing box 15 having the reduction gear mechanism 5 for reducing the revolution of the motor 13 is retained and held by the housing box holding bracket 14. As a result, the housing box 15 is prevented from coming loose and is prevented from becoming broken.

In the power seat device of the present invention, the housing box holding bracket 14 is provided for securing the housing box 15 and is arranged on the load input side 151 of the housing box 15. The housing box 15 is reliably held in place and does not become broken or damaged because the fixing bracket 6, which is arranged on the load output side 152 of the housing box 15, receives the impact load directed to the housing box 15. Thus, the load applied to the housing box 15 is borne on the opposed load output side of the housing box 15.

The housing box holding bracket 14 is advantageously retained in a pivoting or rocking manner on the fixing bracket 6 by the pins 143 which are substantially perpendicular to the axis of the screw member 4. In addition, the arms 42 of the housing box holding bracket 14 are arranged in a plane generally parallel to the plane of movement of the screw member 4. Input loads applied to the housing box 15 are borne in the direction opposed to the input direction and the housing box 15 is reliably held in position.

The housing box 15 is further reliably retained in position as the housing box holding bracket 14 is retained on the fixing bracket 6 by the extensions 142 which extend to the fixing bracket 6 arranged on the load output side 152 of the housing box 15. Thus, the input load to the housing box 15 is borne by the extensions or arms 142 on the opposed output side.

In the power seat device of the present invention, the housing box 15 is retained on the motor 13 by the retaining member 131. As a result, the motor 13 and the reduction gear mechanism 5 are held in a predetermined positional relationship to one another, thereby reliably securing and reinforcing the housing box 15.

Further, by virtue of the present invention, even when the input to the screw member 4 is under a high load, it is possible to achieve a reliable securement of the housing box 15 which has the gear box 10 packaged therein for moving the screw member 4 back and forth. It is also possible with this construction to use an existing housing box 15 as it is without the need for substantial changes.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A power seat device comprising:
   a lift mechanism including a swinging member for vertically moving a seat cushion of a seat;
   an axially movable screw member connected to the swinging member to receive a tension force upon application of an upward force to the seat;
   a motor;
   a housing box connected to the motor and including a reduction mechanism for reducing a rotational speed of the motor, said screw member being operatively associated with the housing box for being axially moved under operation of the motor; and
   a holding member which retains the housing box, said housing box including an extension connected to a fixing member, said extension receiving the tension force applied to the screw member upon application of the upward force to the seat.

2. A power seat device according to claim 1, wherein said holding member is arranged on a load input side of said housing box.

3. A power seat device according to claim 2, including a fixing portion arranged on a load output side of said housing box for fixing the holding member.

4. A power seat device according to claim 3, wherein said screw member possesses an axis, said fixing portion being arranged along the axis of said screw member.

5. A power seat device according to claim 4, wherein said holding member includes an extension connected to the fixing portion, said extension being arranged on the load output side of said housing box.

6. A power seat device according to claim 1, wherein said housing box is retained on said motor by a retaining member.

7. A power seat device according to claim 1, wherein said holding member is arranged on a load input side and a load output side of said housing box.

8. A power seat device comprising:
   a lift mechanism including a swinging member for vertically moving a seat cushion of a seat;
   an axially movable screw member connected to the swinging member and receiving a tension force upon application of an upward force to the seat;
   a housing box adapted to be connected to a motor, said screw member being operatively connected to the housing box, the housing box including a reduction mechanism for reducing a rotational speed of the motor;
   a holding member including a pair of spaced apart arms between which the housing box is located, said pair of arms receiving said tension force when the upward force is applied to the seat; and
   a fixing member adapted to be connected to a rail, said pair of arms being connected to the fixing member.

9. A power seat device according to claim 8, wherein said holding member is pivotally connected to said fixing member.

10. A power seat device according to claim 8, wherein said holding member is connected to said fixing member by pin elements oriented substantially perpendicular to the axis of the screw member.

11. A power seat device according to claim 8, wherein said arms are connected to said fixing portion by pins oriented substantially perpendicular to the axis of the screw member.

12. A power seat device comprising:
    a lift mechanism for vertically moving a seat cushion of a seat;
    an axially movable screw member operatively connected to the lift mechanism, said screw member receiving a tension force upon application of an upward force to the seat;
    a motor;
    a housing box connected to the motor and including a reduction mechanism for reducing a rotational speed of the motor, said screw member being operatively associated with the housing box for being axially moved under operation of the motor;
    a fixing bracket;
    means for transferring to the fixing bracket the tension force received by the screw member and applied to the housing box to prevent damage to the housing box.

13. A power seat device according to claim 12, wherein said means for transferring includes a bracket to which the housing box is secured.

14. A power seat device according to claim 12, wherein said means for transferring includes a pair of arms extending on opposite sides of the housing box, said arms being connected to the fixing bracket.

15. A power seat device according to claim 12, wherein said means for transferring includes a plate to which the housing box is secured and a pair of spaced apart arms extending from the plate on opposite sides of the housing box, said arms being connected to the fixing bracket.

16. A power seat device according to claim 15, wherein said arms are pivotally connected to the fixing bracket.

* * * * *